March 6, 1934.    A. P. YOUNG    1,950,205
LICENSE PLATE HOLDER
Filed Aug. 29, 1933    2 Sheets-Sheet 1

Inventor
Ambrose P. Young.
By A. J. O'Brien
Attorney

March 6, 1934.  A. P. YOUNG  1,950,205
LICENSE PLATE HOLDER
Filed Aug. 29, 1933   2 Sheets-Sheet 2
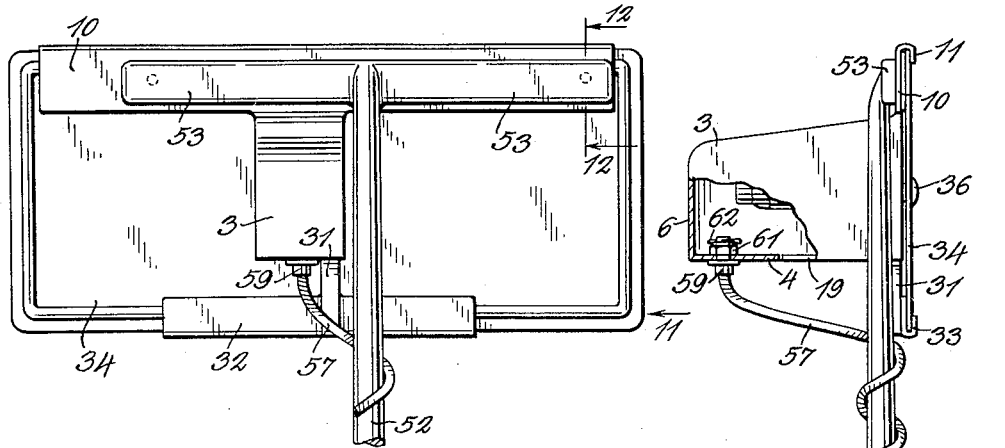
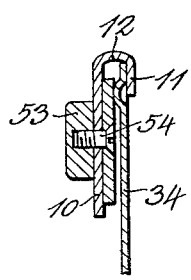
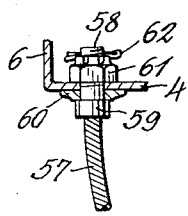
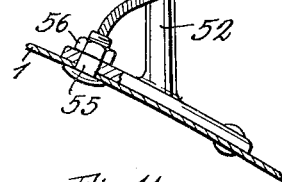
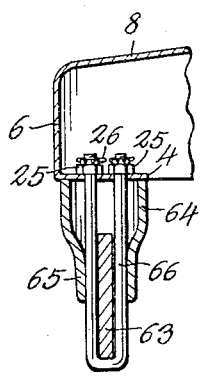
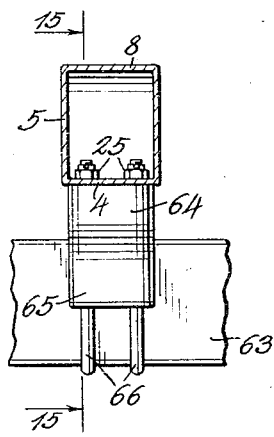
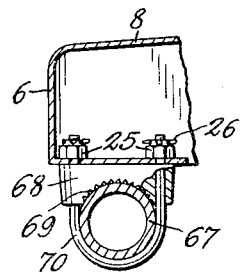
Inventor
Ambrose P. Young.
By A. J. O'Brien
Attorney Patented Mar. 6, 1934

1,950,205

UNITED STATES PATENT OFFICE 1,950,205

LICENSE PLATE HOLDER

Ambrose P. Young, Denver, Colo., assignor of one-third to William T. Hogan and one-sixth to Albert E. Paradice, both of Denver, Colo.

Application August 29, 1933, Serial No. 687,288

11 Claims. (Cl. 40—125)

This invention relates to improvements in devices for securing license plates to automobiles and has reference more particularly to a device by means of which the license plate can be locked to the automobile in such a way that it can be removed only by either destroying the locking device or the plate.

License plates are universally employed in connection with automobiles for the purpose of identifying the automobile in case of loss or in case of accident, and it is therefore quite essential that the license plates, after they have once been applied to a certain car, shall not be removed from this car and applied to some other car because such an exchange makes it impossible to properly identify the owner of the car in case this becomes necessary.

Robbers and others engaged in unlawful enterprise have taken advantage of the present situation in regard to license plates by removing license plates from cars and applying them to their own, and also by carrying a large assortment of license plates which they can readily exchange whenever conditions require this to be done.

It is the object of this invention to produce a device which is to take the place of the ordinary license bracket and which is so constructed that after the license plate has been properly applied thereto, it will be locked in such a way that it cannot be removed except by the use of a special tool, without destroying the plate so that it will be unfit for further use and it shall also make it impossible to apply another license plate to the holder after the first has been forceably removed.

Another object of this invention is to seal the license plate and the holder to the automobile body by means which must be broken or destroyed before the plate can be removed and which seal cannot be replaced except by some one properly authorized for this purpose.

In order to describe this invention so that it can readily be understood, reference will now be had to the accompanying drawings, in which the preferred form of the invention has been illustrated, and in which:

Fig. 10 is a rear elevation of the device which forms the subject of this invention showing the same attached to an ordinary license plate bracket;

Fig. 11 is an end elevation, partly broken away, looking in the direction of arrow 11, Fig. 10;

Fig. 12 is a section taken on line 12—12, Fig. 10;

Fig. 13 is a fragmentary view showing how the sealing cable is attached to the license plate holder or to the license plate;

Fig. 14 is a view, partly in section, showing one way of attaching the holder to a bumper;

Fig. 15 is a section taken on line 15—15, Fig. 14; and

Fig. 16 is a view showing one means of attaching the holder to a round supporting bar.

Figure 1:
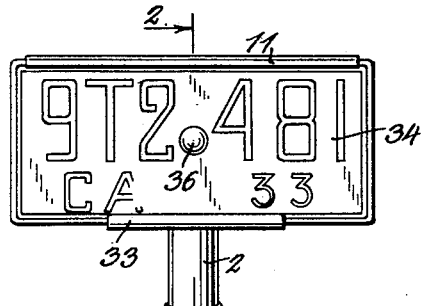
Fig. 1 is a side elevation of a license plate showing the same supported by the device which forms the subject of this invention.

In the drawings reference numeral 1 designates a fender, for example, the rear fender of an automobile, and reference numeral 2 designates a tubular support for the housing which has been indicated by reference numeral 3. The housing is provided with a bottom 4 from opposite sides of which walls 5 extend upwardly. Extending upwardly from one end of the bottom is an end wall 6 which is connected by means of a curved portion 7 with a top wall 8. It will be seen from Fig. 2 that the bottom 4 is shorter than the top 8 and terminates at the point indicated by reference numeral 9. The upper end of the top is extended and projects upwardly as indicated by reference numeral 10, and has its upper end bent downwardly as indicated at 11 to form a recess 12 that has its open side on the lower side thereof. The portion indicated by reference numeral 10 extends to both sides of the casing as shown most clearly in Fig. 10. Two spaced partitions 13 and 14 are provided on the inside of the housing and these partitions have their ends and tops either formed integral with or connected to the walls of the housing. Where the housing is cast these partition walls are cast integrally therewith, but if the housing is made in some other way, these partitions are secured thereto by suitable means.

Figure 3:
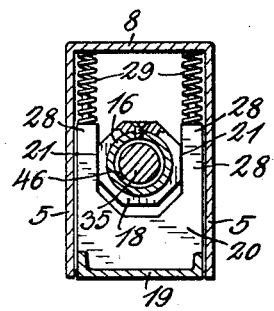
Fig. 3 is a section taken on line 3—3, Fig. 2.
Figure 2:
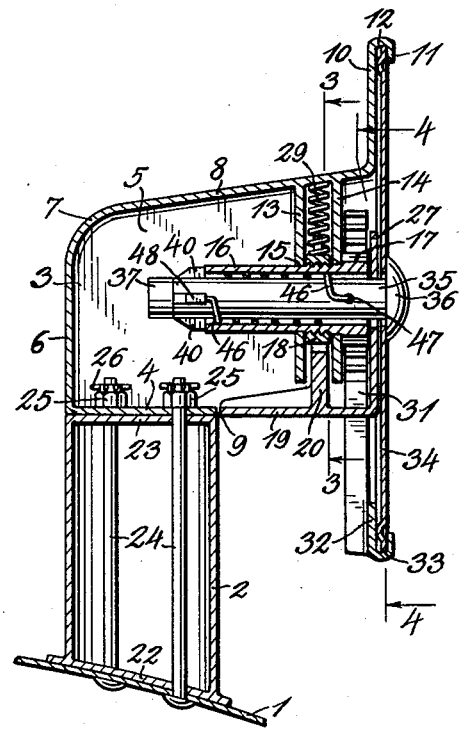
Fig. 2 is a section taken on line 2—2, Fig. 1.
Figure 6:
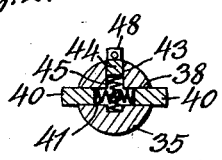
Fig. 6 is a transverse section taken on lines 6—6, Fig. 7.

The lower ends of the partitions terminate a short distance above the lower edges of walls 5, as shown in Fig. 2. Each of the partition walls is provided with an opening 15 which forms a bearing for the tubular hub 16 that extends from one side of the pinion 17. When the pinion is inserted through the bearings in the partitions, the nut 18 is first put in position between these partition walls and is held against rotation while it is threadedly connected with the tubular hub in a manner quite apparent from Fig. 2. The periphery of the nut 18 is polygonal and is preferably octagonal. After the nut has been threaded onto the tubular hub, it is secured against rotation by means of a set screw or some similar means which has been shown in Fig. 3. In the embodiment illustrated, the side of the casing to the right, when viewed as in Fig. 2 is open, and the right hand end of the bottom is also open, but when the parts are in operative position, a locking device is applied which consists of a bottom member 19 having an upwardly extending portion 20 that is provided with an opening like that shown in Fig. 3, and which has parallel sides 21 which are spaced apart a sufficient distance to enable them to engage opposite parallel surfaces on the nut 18. When the part 20 is positioned as shown in Fig. 3, it prevents the nut 18 from being rotated and as this is nonrotatably connected with the hub 16, the pinion 17 will be held against rotary movement whenever the part 20 is in position.

For the purpose of securing the housing to the fender, the support 2 has been provided at its lower end with a bottom 22 and at its upper end with a top 23. The bottom and the top are provided with holes through which the bolts 24 extend. The bolts are first passed through openings in the fender, after which they are passed through the openings in the bottom 22 and the top 23 and from thence extend through suitably located openings in the bottom 4 of the housing. Castellated nuts 25 are applied to the bolts within the housing and are held against removal by means of split pins 26.

When the locking member 20, comprising the base 19 and the perforated plate 27, is removed access can be had through the bottom of the housing to the nuts 25 for the purpose of tightening and loosening the same, but when the locking member is in place, the inside of the housing is inaccessible. The part 27 is provided with an opening which registers with the opening in the hub 16 when the locking member is in position. Secured to the upwardly extending side members 28 of the locking member are springs 29 which are of such length that they will be under considerable compression when the locking member is in the position shown in Fig. 2 and these springs therefore exert a force tending to move the locking member downwardly and out of locking position.

Figure 4:
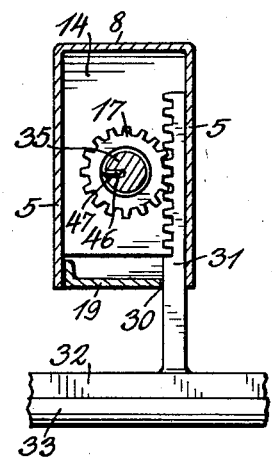
Fig. 4 is a section taken on line 4—4, Fig. 2.
Figure 5:
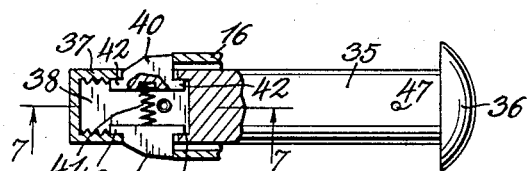
Fig. 5 is a side view showing the pin for locking the license plate, the said pin being shown partly in elevation and partly in section.
Figure 7:
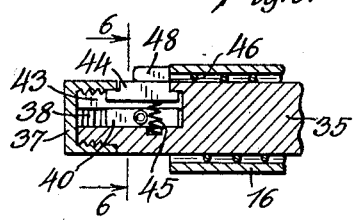
Fig. 7 is a section taken on line 7—7, Fig. 5.

The bottom 19 has an opening 30 through which the rack 31 can pass and the teeth on the rack are so arranged that they will engage with the teeth on the pinion in the manner shown in Fig. 4. Secured to the lower end of the rack 31 is a license plate engaging member 32, which is reversely bent so as to provide a groove 33 with its open side upwardly. The grooves 12 and 33 engage respectively the upper and the lower edges of the license plate 34 as shown quite clearly in Figs. 1 and 2. When the license plate is to be applied to the holder the upper edge is inserted into the groove 12, after which the rack 31 is inserted through the opening in plate 19 and passed upwardly into engagement with the pinion and then moved upwardly until the edges of the license plate abut the bottoms of the two grooves. The locking member 20 is now moved upwardly into the space between the partitions 13 and 14 until it reaches a position like that shown in Fig. 3, whereby it serves to hold the pinion against rotation. The license plate is provided with a central opening which registers with the opening in the hub when the plate is in adjusted position and for the purpose of securing the plate and the locking member to the housing a pin 35 has been provided. This pin is provided at one end with a head 36, while the other end has a cap 37 threadedly connected thereto. An opening 38 is milled transversely through the end of the pin 35 and the bottom of this opening is extended into the interior of the pin so as to leave shoulder 39. Latching lugs 40 are placed in the milled opening 38 and separated from each other by means of a compression spring 41. The lugs are provided with projections 42 at each end, one of which engages the inside wall of the cap 37, while the other engages the shoulder 39 in the manner shown in Fig. 5. Another slot 43 is milled at right angles to the transverse slot above referred to and located within this is another lug which has been designated by reference numeral 44. This lug is made substantially like the other two, except when in the position shown in Fig. 7, in which position it is held by means of the spring 45, the outer surface of the lug is flush with the outer surface of the bolt.

Since the lugs 40 are held in extended position by means of the spring 41, it is evident that if this securing pin is inserted through the openings in the license plate, in the part 27 and in the hub 16 and moved into the position shown in Fig. 2, lugs 40 will be moved outwardly by the action of the spring and engage the ends of the tubular hub, thereby serving to hold the pin against withdrawal. After the pin has once been put into the position shown, it is evident that the license plate cannot be removed without either breaking the plate, or breaking the support. It is also evident that the locking member 20 with the parts attached to it will be locked in operative position, due to the fact that the pin 35 extends through a hole in the member 27. In order to remove the plate, it is necessary to employ a special cutting tool for the purpose of cutting the head 36 from the pin, but this cutting tool has not been shown in this application because it involves a separate invention.

Let us now suppose that the head 36 is cut from the remainder of the pin, it will then be evident that the pin can be pushed inwardly sufficiently to release the locking means 20, which will thereupon be moved downwardly by the action of the springs 29, and as soon as the sides 21 are moved out of engagement with the nut 18, the weight of the rack 31 and parts supported thereby will be sufficient to rotate the pinion and let the rack 31 drop out. The operator can now insert his fingers into the casing from the lower side and press the lugs 40 inwardly, whereupon the pin can be removed and replaced by a new pin. The pin 35 is preferably provided with a code number that can be registered in the office where the license is registered so that the records will show whether the pin has been replaced or not. The head 36 can also be provided with some appropriate insignia such as the seal of the state in which the license is issued and the pins can be sold by the state in connection with the license plate, thus making it practically impossible for anyone to deceive a properly informed officer of the law by substituting unauthorized plates and pins.

It is sometimes desirable to have the pin 35 moved inwardly automatically as soon as the head is removed and when this is to be provided for the pin is made somewhat smaller than the opening in the hub and surrounded by a helical spring 46. One end of spring 46 is anchored in an opening 47 in the pin and the other end is provided with a small metal block 48. When the pin is to be inserted into the hub, the spring is put under tension and the block 48 is pushed downwardly against the lug 44 until the outer surface of block 48 is down below the outer surface of the spring whereupon the pin can be pushed through the opening and as soon as the block 48 has passed through the opening in the hub 16, it will be moved outwardly by the combined action of the member 44 and the resiliency of the spring 46 and engage the end of the hub, whereupon a force will be produced which tends constantly to move the pin inwardly and therefore as soon as the head of the bolt is broken, the pin will automatically move into the housing a sufficient distance to release the locking means 20 and the rack 31, together with the plate 34.

Figures 8, 9:
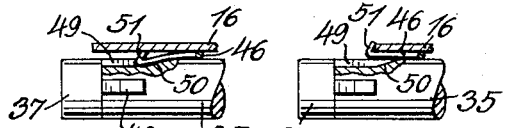
Fig. 8 is a fragmentary view showing a slightly modified construction of pin and showing the same as it appears while it is being moved to operative position.
Fig. 9 is a view similar to that shown in Fig. 8, but shows the parts as they appear after the pin has been moved to operative position.

In lieu of the lug 44 and the member 48, the pin can be provided with a recess 49 having an inclined wall 50. The end of the spring is bent outwardly in the form of a hook, as indicated at 51, and when the pin is to be inserted into the opening in the hub, the spring is tensioned and bent into the position shown in Fig. 8, whereupon the pin can be inserted and the spring will be held against reverse movement until the hook 51 is entirely through the hub, whereupon it will be moved outwardly into the position shown in Fig. 9.

It is apparent from the above description that the license plate holding device which has just been described can be connected to the fender or other parts of an automobile by the means shown in Fig. 2, or any other suitable means and when the license plate has been secured to the holder in the manner described, it is impossible to remove the license plate without first breaking the housing or by so injuring the license plate that it will be conspicuous and therefore unsuited for the purpose of deceiving the officers of the law.

Where the license plate holding device just described is to be attached to an ordinary bracket like that indicated by reference numeral 52 in Fig. 11, the housing is secured to the transverse member 53 by two or more screws 54 in the manner shown in Fig. 12. In order to make it impossible to switch the plate holding device without leaving some evidence of the operation, the latter is connected with the automobile by means of a seal which has been shown clearly in Figs. 11 and 13 and which consists of a bolt 55 having a nut 56. Secured to one end of the bolt is a radio cable 57. This cable is welded or brazed to the bolt so as to be practically integral therewith. Secured to the other end of the cable is another bolt 58 having a small rounded head 59. A washer 60 is provided and this washer rests against the inner side of the head 59. The head 59 must not have a diameter larger than the root diameter of the thread on bolt 55 so that the nut 56 can be slipped over the head 59. When this seal is to be used, one of the rivets holding the bracket 52 is removed and bolt 55 inserted in place thereof. Before the bolt 55 can be inserted, it is, of course, necessary to pass the bolt 58 and the cable 57 through the opening. After the bolt 55 has been inserted through the opening, the nut 56 is then passed over the bolt 58 and connected with the bolt 55, as shown in Fig. 11. The washer 60 is now applied to the bolt 58, after which this bolt is passed through an opening in the bottom of the housing, whereupon the nut 61 is put in place and tightened. This nut may be held against accidental removal by means of a split pin 62. If the seal just described is to be used for sealing an ordinary license plate to the car, the nut 61 can be welded to the bolt so that it will be impossible to remove it and it will therefore be impossible to remove the license plate without breaking the cable 57 or injuring the plate.

At the front end of the automobile, the plate holding device can be supported from the bumper 63 and when this is to be done a pipe 64 is provided whose lower end is flattened as indicated at 65 and slots are provided at opposite sides into which the upper edge of the bumper is inserted. U-bolts 66 pass around the bumper and have their ends extending through openings in the bottom 4 of the housing, and these ends are provided with nuts 25 and pins 26 in the manner shown and described in connection with Fig. 2. If the housing is to be supported on a transversely extending bar as, for example, the tubular bar 67 which connects the two headlights, it is preferable to provide a saddle 68 having a concave toothed recess 69 that rests against the outer surface of the tube. U-bolts 70 pass through openings in the saddle 68 and the ends of these U-bolts are provided with nuts 25 and split pins 26 as described in connection with Fig. 2.

There are, of course, many specifically different ways in which the housing can be attached to the automobile, but those shown and described herein are believed to be the ones that will be found best suited for the majority of cases.

From the above description it will be seen that after a license plate has been secured to the holder by the means shown and described, it will be positively locked to the holder and the holder can then be locked to the automobile, either by the means shown in Fig. 11, or in the manner shown in Fig. 2.

When an automobile is equipped with the license plate holder just described, it is exceedingly difficult to remove the license plate without breaking it or injuring it so as to make it unsuited for further use. Even if the unauthorized person were provided with means for removing the head 36 from the pin, he would not be able to substitute another plate without first providing another locking pin and since the head 36 is provided with some insignia, as above pointed out, it is evident that a substitute locking pin would be easily detected by the police officers and any car that had such a substitute pin would be open to suspicion.

If a holder like the one above described is made compulsory, the result will be that it will be practically impossible for lawbreakers to steal plates from automobiles and to apply these plates to their own cars and if this is attempted the parts will leave unmistakable signs that they have been tampered with, with the result that the owner of such a car, or the driver thereof, will find it necessary to explain the condition of his plate and plate holder to the satisfaction of the officer who inquires about the same.

Having described the invention what is claimed as new is:

1. A license plate holder comprising, in combination, a housing, means carried by the housing and extending upwardly therefrom for engaging the upper edge of a license plate, means adjustably connected with the housing for engaging the lower edge of the plate, means for locking the last mentioned means in plate engaging position, and means for nonmovably securing the locking means in locking position.

2. A license plate holder comprising, in combination, a housing, a license plate engaging member extending upwardly from the housing and provided at its upper end with means for engaging the upper edge of a license plate, means extending downwardly from the housing and adjustably connected therewith for engaging the lower edge of the license plate, means for locking the last mentioned means in plate engaging position, and means comprising a headed pin for securing the plate against movement relative to the housing, and for securing the locking means in operative position.

3. A license plate holder comprising, in combination, a housing, a license plate engaging member carried by the housing and extending upwardly therefrom, the upper end of the plate engaging member having means for engaging the upper edge of a license plate, a second license plate engaging member adjustably connected with the housing and extending downwardly therefrom, the lower end of the last mentioned member having means for engaging the lower edge of the plate, means located within the housing and operatively connected with the last mentioned plate engaging means for interlocking it with the housing, means for securing the last mentioned plate engaging means in plate engaging position comprising a headed pin, the housing, a portion of the locking means and the license plate having registering openings for the reception of the headed pin which extends through the several openings, and means for holding the pin against withdrawal whereby the license plate will be locked to the housing.

4. A device for nonremovably attaching a license plate, to an automobile comprising, in combination, a housing, means for locking the housing to the automobile, a pinion having a tubular hub, said pinion being located within the housing and mounted for rotation about the axis of the hub, a plate engaging member located above the housing, said member having a downwardly opening groove for the reception of the upper edge of the license plate, a plate engaging means adjustably connected with the housing and provided at its lower end with an upwardly opening groove for the reception of the lower edge of the license plate, the last mentioned plate engaging means having an upwardly extending toothed rack for engaging the pinion whereby the latter will be rotated when the plate engaging member is adjusted, means for locking the pinion against rotation when the plate engaging means has been adjusted to plate engaging position, the license plate having an opening, and means comprising a pin having one end provided with a head, for securing the locking means in operative position and for securing the plate to the housing, said pin extending through the opening in the plate and in the hub, and means for holding the pin against withdrawal whereby the plate cannot be removed without being damaged unless the pin is broken.

5. In a license plate holder, a housing having a member extending from one side thereof and provided with an open groove for receiving one edge of a license plate, the housing having a transverse partition provided with an opening forming a bearing, a pinion having a tubular hub journaled in the bearing, a polygonal collar located on the side of the partition opposite from the pinion, a removable locking means for engaging the other edge of the plate and the polygonal flange and for holding the pinion against rotation, means for securing the locking means in operative position comprising a pin provided with a head at one end and a spring pressed latching pawl at the other end, the pin extending through the hub and through openings in the plate and a portion of the locking means.

6. A device for nonremovably attaching a license plate to an automobile, comprising, in combination, a housing, means for attaching the housing to the body of an automobile, a sealing means connecting the housing with the automobile body, a license plate, means comprising a plate engaging locking member for securing the plate to the housing, means comprising a headed pin for securing the locking member and plate to the housing, and spring controlled means for releasing the license plate when the pin is broken.

7. A license plate holder comprising, in combination, a housing, means rigidly attached to the housing for engaging one edge of a license plate, means adjustably attached to the housing for engaging the other edge of the plate, means for locking the last mentioned means in plate engaging position, means for holding the locking means in operative position and for securing the plate to the housing.

8. A license plate holder comprising, in combination, a housing, means rigidly attached to the housing for engaging one edge of a license plate, means adjustably attached to the housing for engaging the other edge of the plate, means for locking the last mentioned means in plate engaging position, means for holding the locking means in operative position and for securing the plate to the housing, said last mentioned means comprising a pin having one end provided with a head and the other with a spring-pressed latching lug.

9. A license plate holder comprising, in combination, a housing, a license plate engaging member extending upwardly therefrom and provided with means for engaging the upper edge of a license plate, a partition extending across the housing, the partition having an opening, a license plate located against the housing adjacent the partition, the plate having an opening which registers with the opening in the partition, and a headed pin for securing the license plate in place on the holder, one end of the pin having a head for engaging the outer surface of the license plate and a yieldable latching device associated with the other end of the pin for cooperating with the inner surface of the partition for holding the pin against withdrawal.

10. A license plate holder comprising, in combination, a housing having one side partly closed by a partition, a license plate engaging member extending upwardly from the housing at the end having the partition, the upper end of the plate engaging member having means for engaging a license plate, the partition having an opening, a license plate positioned with one side against the end of the housing which has the partition, the license plate having an opening so located that it will register with the opening in the partition when the plate is properly positioned, means comprising a headed pin for securing the license plate to the housing, the head of the pin engaging the outer surface of the license plate and a yieldable latching device for interlocking the pin and the partition for preventing the pin from being withdrawn.

11. A license plate holder comprising, in combination, a housing having one side partly closed by a partition, a license plate engaging member at the top of the housing at the end having the partition, the plate engaging member having means for engaging the upper edge of a license plate, the partition having an opening, a license plate positioned with one side against the end of the housing which has the partition, the license plate having an opening so located that it will register with the opening in the partition when the plate is properly positioned, means comprising a headed pin for securing the license plate to the housing, the head of the pin engaging the outer surface of the license plate, a yieldable latching device for interlocking the pin and the partition for preventing the pin from being withdrawn, and means releasable from the inside of the housing only for securing the housing to an automobile.

AMBROSE P. YOUNG.